(12) United States Patent
Suzuki

(10) Patent No.: US 6,659,952 B2
(45) Date of Patent: Dec. 9, 2003

(54) ULTRASONIC DIAGNOSING APPARATUS AND METHOD FOR VIRTUALLY INCREASING POWER OF PIXELS

(75) Inventor: Yoichi Suzuki, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 10/139,918

(22) Filed: May 6, 2002

(65) Prior Publication Data

US 2003/0018258 A1 Jan. 23, 2003

(30) Foreign Application Priority Data

May 7, 2001 (JP) ........................................ 2001-136481

(51) Int. Cl.[7] ................................................ A61B 8/00
(52) U.S. Cl. ...................................... 600/443; 600/447
(58) Field of Search ................................ 600/437, 438, 600/440–471, 407; 128/916, 920; 367/7, 11, 130, 138; 73/620–633; 345/156; 382/106, 293; 348/701

(56) References Cited

U.S. PATENT DOCUMENTS

| 5,931,784 | A | * | 8/1999 | Kajiwara et al. | ............ | 600/441 |
| 6,015,384 | A | * | 1/2000 | Ramamurthy et al. | ...... | 600/440 |
| 6,110,120 | A | * | 8/2000 | Holley et al. | ................ | 600/458 |
| 6,171,246 | B1 | * | 1/2001 | Averkiou et al. | ............ | 600/458 |
| 6,306,095 | B1 | * | 10/2001 | Holley et al. | ................ | 600/458 |

* cited by examiner

Primary Examiner—Ali M. Imam
(74) Attorney, Agent, or Firm—Carl B. Horton, Esq.; Armstrong Teasdale LLP

(57) ABSTRACT

In order to inhibit blooming and prevent degradation in the capability of projecting thin blood vessels, the luminance basically increases as power P becomes high. However, when there are two sampling points identical in power P but different in variance V in a region low in power P ($P \leq P1$), the luminance of a pixel corresponding to the sampling point relatively large in variance is set higher than that of a pixel corresponding to the sampling point relatively small in variance V.

17 Claims, 7 Drawing Sheets

ULTRASONIC DIAGNOSING APPARATUS AND METHOD FOR VIRTUALLY INCREASING POWER OF PIXELS

CROSS REFERENCE TO RELATED APPLICATIONS

This application claims the benefit of Japanese Application No. 2001-136481 filed May 7, 2001.

BACKGROUND OF THE INVENTION

The present invention relates to an ultrasonic image displaying method and an ultrasonic diagnosing apparatus, and more specifically to an ultrasonic image displaying method and an ultrasonic diagnosing apparatus both capable of inhibiting blooming in which a thick blood vessel is projected so as to protrude-outside from an actual vessel wall and preventing degradation of the capability of projecting a thin blood vessel.

In a conventional ultrasonic diagnosing apparatus, adjustments for reducing gain (magnitude of a conversion coefficient where power is converted to a pixel value) have been carried out to inhibit blooming upon execution of a power display (Power Doppler Imaging).

While a gain reduction allows inhibition of the blooming, the capability of projecting thin blood vessels is also lowered.

This is the same even where contrast agents are administered. Namely, when attempt is made to inhibit blooming of thick blood vessels raised in power with the injection of the contrast agents, it is necessary to greatly reduce the gain. The capability of projecting the thin blood vessels is eventually degraded even if the contrast agents are administered and hence the power is raised.

With this view, a problem arises in that it is hard to control the gain.

SUMMARY OF THE INVENTION

Therefore, an object of the present invention is to provide an ultrasonic image displaying method and an ultrasonic diagnosing apparatus both capable of inhibiting blooming and preventing degradation of the capability of projecting thin blood vessels.

In a first aspect, the present invention provides an ultrasonic image displaying method characterized by transmitting an ultrasound wave to within an object to thereby collect ultrasound echo signals from within the object, acquiring power and variance at a large number of two-dimensionally distributed sampling points, increasing luminance according as pixels corresponding to sampling points high in power, and generating and displaying an ultrasonic image in which, when there are two sampling points identical in power but different in variance and low in power, the luminance of the sampling point relatively large in variance is set higher than luminance of the sampling point relatively small in variance.

In the ultrasonic image displaying method according to the first aspect, the luminance is made high according as a pixel corresponding to each sampling point high in power in a manner similar to the conventionally known power display. However, the luminance at each sampling point relatively large in variance is increased in a power low region in addition to the above.

When contrast agents are administered to increase power, blooming can be inhibited by greatly reducing gain. On the other hand, the capability of projecting thin blood vessels in the form of a power display is also degraded due to the great reduction in gain. However, when the contrast agents are administered, the variance becomes also large as well as an increase in power. Therefore, the luminance of each sampling point relatively large in variance is turned up and thereby raised in the region low in power P, wherein the blooming presents a problem. As a result, the capability of projecting the thin blood vessels is enhanced. Namely, it is possible to inhibit the blooming and prevent degradation in the capability of projecting the thin blood vessels.

In a second aspect, the present invention provides an ultrasonic image displaying method characterized by transmitting an ultrasound wave to within an object to thereby collect ultrasound echo signals from within the object, acquiring power and variance at a large number of two-dimensionally distributed sampling points, reflecting the strength of power at a given sampling point on at least one of luminance, chroma and hue of its corresponding pixel, and when there are two sampling points identical in power but different in variance and low in power, displaying a pixel corresponding to the sampling point relatively large in variance so as to be seen relatively higher in power than a pixel corresponding to the sampling point relatively small in variance.

In the ultrasonic image displaying method according to the second aspect, the strength of power is reflected on at least one of the luminance, chroma and hue of each pixel. In addition to the above, however, each sampling point relatively large in variance is displayed so as to be seen relatively high in power in a power low region.

When contrast agents are administered to increase power, blooming can be inhibited by greatly reducing gain. On the other hand, the capability of projecting thin blood vessels in the form of a power display is also degraded due to the great reduction in gain. However, when the contrast agents are administered, the variance becomes also large as well as an increase in power. Therefore, the power of each sampling point relatively large in variance is turned up and thereby displayed so as to have become high apparently in the power low region wherein the blooming presents a problem. As a result, the capability of projecting the thin blood vessels is enhanced. Namely, it is possible to inhibit the blooming and prevent degradation in the capability of projecting the thin blood vessels.

In a third aspect, the present invention provides an ultrasonic image displaying method characterized by transmitting an ultrasound wave to within an object to thereby collect ultrasound echo signals form within the object, acquiring power and variance at a large number of two-dimensionally distributed sampling points, increasing luminance according as pixels corresponding to sampling points high in power in a power high region, setting a load of power higher than a load of variance when the variance is small and setting a load of power lower than a load of variance when the variance is large, in a power low region to thereby determine a load sum of the power and variance, and generating and displaying an ultrasonic image increased in luminance according as pixels corresponding to sampling points large in the load sum.

In the ultrasonic image displaying method according to the third aspect, the luminance is enhanced according as a pixel corresponding to each sampling point high in power in a power high region. On the other hand, in a power low region, the luminance is raised according as pixels corresponding to sampling points large in load sum of power and variance. When the variance is small at this time, the load of the power is made larger than that of the variance. When the variance is large, the load of the power is set smaller than that of the variance.

When contrast agents are now administered to increase power, blooming can be inhibited by greatly reducing gain. On the other hand, the capability of projecting thin blood vessels in the form of a power display is also degraded due to the great reduction in gain. However, when the contrast agents are administered, the variance becomes also large as well as an increase in power. Therefore, the luminance of each sampling point relatively large in variance is turned up and thereby raised in the power low region wherein the blooming presents a problem. As a result, the capability of projecting the thin blood vessels is enhanced. Namely, it is possible to inhibit the blooming and prevent degradation in the capability of projecting the thin blood vessels.

In a fourth aspect, the present invention provides an ultrasonic image displaying method characterized by transmitting an ultrasound wave to within an object to thereby collect ultrasound echo signals from within the object, acquiring power and variance at a large number of two-dimensionally distributed sampling points, reflecting the strength of power on at least one of luminance, chroma and hue of its corresponding pixel in a power high region, setting a load of power higher than a load of variance when the variance is small and setting a load of power lower than a load of variance when the variance is large, in a power low region to thereby determine a load sum of the power and variance, and generating and displaying an ultrasonic image in which the magnitude of the load sum is reflected on at least one of luminance, chroma and hue of its corresponding pixel.

In the ultrasonic image displaying method according to the fourth aspect, the strength of power is reflected on at least one of the luminance, chroma and hue of each pixel in a power high region. On the other hand, when the magnitude of a load sum of power and variance is reflected on at least one of the luminance, chroma and hue of each pixel in a power low region. When the variance is small at this time, the load of the power is set larger than that of the variance. When the variance is large, the load of the power is made smaller than that of the variance.

When contrast agents are now administered to increase power, blooming can be inhibited by greatly lowering gain. On the other hand, the capability of projecting thin blood vessels in the form of a power display is also degraded due to the great reduction in gain. However, when the contrast agents are administered, the variance becomes also large as well as an increase in power. Therefore, the load sum at sampling points relatively large in variance is turned up and thereby increased in the power low region wherein the blooming presents a problem. As a result, the capability of projecting the thin blood vessels is enhanced. Namely, it is possible to inhibit the blooming and prevent degradation in the capability of projecting the thin blood vessels.

In a fifth aspect, the present invention provides an ultrasonic image displaying method characterized in that in the ultrasonic image displaying method having the above construction, when power is defined as P, variance is defined as V and a load sum is defined as D, $$D = P \cdot a + V \cdot (1-a)$$

where a load parameter a is 1 when the variance is small, 0 when the variance is large, and changes smoothly or stepwise when the variance is intermediate.

In the ultrasonic image displaying method according to the fifth aspect, when the variance is small, the load (1) of power becomes larger than the load (0) of variance. On the other hand, when the variance is large, the load (0) of power becomes smaller than the load (1) of variance. When the variance is intermediate, the load changes smoothly or stepwise. As a result, the ultrasonic image displaying method according to the third or fourth aspect can suitably be carried out.

In a sixth aspect, the present invention provides an ultrasonic image displaying method characterized in that in the ultrasonic image displaying method having the above construction, a load parameter a is 1 when the variance is small, 0 when the variance is large, and changes suddenly as the variance increases.

In the ultrasonic image displaying method according to the sixth aspect, when the variance is small, the load of power becomes dominant but the load of variance suddenly increases as the variance increases. As a result, the ultrasonic image displaying method according to the third aspect or fourth aspect can suitably be carried out.

In a seventh aspect, the present invention provides an ultrasonic image displaying method characterized in that in the ultrasonic image displaying method having the above construction, a real-time scan or an intermittent scan is carried out.

In the ultrasonic image displaying method according to the seventh aspect, a packet size can be reduced because the strength of a signal from contrast agents is strong, and real time properties at a real-time scan can be improved. Since the contrast agents are used, the present method is used even for tissue dye shades by an intermittent scan.

In an eighth aspect, the present invention provides an ultrasonic image displaying method characterized in that in the ultrasonic image displaying method having the above construction, the ultrasonic image and a B mode image are displayed so as to overlap each other.

In the ultrasonic image displaying method according to the eighth aspect, the ultrasonic image and B mode image employed in each of the first through seventh aspects are caused to overlap each other to allow mapping of the ultrasonic image onto a tissue structure.

Incidentally, the B mode image is also of an ultrasonic image in a general sense. However, when called simply an ultrasonic image in the present specification, it is intended only for the ultrasonic image according to the present invention.

In a ninth aspect, the present invention provides an ultrasonic image displaying method characterized in that in the ultrasonic image displaying method having the above construction, the object is a liver infiltrated with contrast agents.

In the ultrasonic image displaying method according to the ninth aspect, blooming in thick blood vessels of the liver can be inhibited and thin blood vessels can suitably be projected.

In a tenth aspect, the present invention provides an ultrasonic diagnosing apparatus characterized by comprising an ultrasound probe, transmitting and receiving means for transmitting an ultrasound wave from the ultrasound probe to within an object to thereby collect ultrasound echo signals from within the object, power/variance acquiring means for acquiring power and variance at a large number of two-dimensionally distributed sampling points from the ultrasound echo signals, ultrasonic image generating means for increasing luminance according as pixels corresponding to sampling points high in power, and generating, when there are two sampling points identical in power but different in variance and low in power, an ultrasonic image in which the luminance of the sampling point relatively large in variance is set higher than that of the sampling point relatively small in variance, and image display means for displaying the ultrasonic image thereon.

In the ultrasonic diagnosing apparatus according to the tenth aspect, the ultrasonic image displaying method according to the first aspect can suitably be carried out.

In an eleventh aspect, the present invention provides an ultrasonic diagnosing apparatus characterized by comprising an ultrasound probe, transmitting and receiving means for transmitting an ultrasound wave from the ultrasound probe to within an object to thereby collect ultrasound echo signals from within the object, power/variance acquiring means for obtaining power and variance at a large number of two-dimensionally distributed sampling points from the ultra sound echo signals, ultrasonic image generating means for reflecting the strength of power at a given sampling point on at least one of luminance, chroma and hue of its corresponding pixel, and when there are two sampling points identical in power but different in variance and low in power, generating an ultrasonic image in which a pixel corresponding to the sampling point relatively large in variance is set so as to be seen relatively higher in power than a pixel corresponding to the sampling point relatively small in variance, and image display means for displaying the ultrasonic image thereon.

In the ultrasonic diagnosing apparatus according to the eleventh aspect, the ultrasonic image displaying method according to the second aspect can suitably be carried out.

In a twelfth aspect, the present-invention provides an ultrasonic diagnosing apparatus characterized by comprising an ultrasound probe, transmitting and receiving means for transmitting an ultrasound wave from the ultrasound probe to within an object to thereby collect ultrasound echo signals from within the object, power/variance acquiring means for obtaining power and variance at a large number of two-dimensionally distributed sampling points from the ultrasound echo signals, ultrasonic image generating means for setting a load of power higher than a load of variance when the variance is small and setting a load of power lower than a load of variance when the variance is large, to thereby determine a load sum of the power and variance, and generating an ultrasonic image increased in luminance according as pixels corresponding to sampling points large in the load sum.

In the ultrasonic diagnosing apparatus according to the twelfth aspect, the ultrasonic image displaying method according to the third aspect can suitably be carried out.

In a thirteenth aspect, the present invention provides an ultrasonic diagnosing apparatus characterized by comprising an ultrasound probe, transmitting and receiving means for transmitting an ultrasound wave from the ultrasound probe to within an object to thereby collect ultrasound echo signals from within the object, power/variance acquiring means for obtaining power and variance at a large number of two-dimensionally distributed sampling points from the ultrasound echo signals, ultrasonic image generating means for setting a load of power higher than a load of variance when the variance is small and setting a load of power lower than a load of variance when the variance is large, to thereby determine a load sum of the power and variance and generating an ultrasonic image in which the magnitude of the load sum is reflected on at least one of luminance, chroma and hue of its corresponding pixel, image display means for displaying the ultrasonic image thereon.

In the ultrasonic diagnosing apparatus according to the thirteenth aspect, the ultrasonic image displaying method according to the fourth aspect can suitably be carried out.

In a fourteenth aspect, the present invention provides an ultrasonic diagnosing apparatus characterized in that in the ultrasonic diagnosing apparatus having the above construction, when power is defined as P, variance is defined as V and a load sum is defined as D, $$D = P \cdot a + V \cdot (1-a)$$

where a is 0 when the variance is large, 1 when the variance is small, and changes smoothly or stepwise when the variance is intermediate.

In the ultrasonic diagnosing apparatus according to the fourteenth aspect, the ultrasonic image displaying method according to the fifth aspect can suitably be carried out.

In a fifteenth aspect, the present invention provides an ultrasonic diagnosing apparatus characterized in that in the ultrasonic diagnosing apparatus having the above construction, a is 0 when the variance is large, and 1 when the variance is small, and a changes gently in the neighborhood of a=0 and changes suddenly in the neighborhood of a=1.

In the ultrasonic diagnosing apparatus according to the fifteenth aspect, the ultrasonic image displaying method according to the sixth aspect can suitably be carried out.

In a sixteenth aspect, the present invention provides an ultrasonic diagnosing apparatus characterized in that in the ultrasonic diagnosing apparatus having the above construction, a real-time scan or an intermittent scan is carried out.

In the ultrasonic diagnosing apparatus according to the sixteenth aspect, the ultrasonic image displaying method according to the seventh aspect can suitably be carried out.

In a seventeenth aspect, the present invention provides an ultrasonic diagnosing apparatus characterized in that in the ultrasonic diagnosing apparatus having the above construction, the ultrasonic image generating means generates an ultrasonic image obtained by causing the ultrasonic image and a B mode image to overlap each other.

In the ultrasonic diagnosing apparatus according to the seventeenth aspect, the ultrasonic image displaying method according to the eighth aspect can suitably be carried out.

According to an ultrasonic image displaying method and an ultrasonic diagnosing apparatus of the present invention, it is possible to inhibit blooming and prevent degradation of the capability of projecting thin blood vessels.

Further objects and advantages of the present invention will be apparent from the following description of the preferred embodiments of the invention as illustrated in the accompanying drawings.

DETAILED DESCRIPTION OF THE INVENTION

The present invention will hereinafter be described in further details by embodiments of the invention, which are illustrated in the accompanying drawings.

First Embodiment

Figure 1:
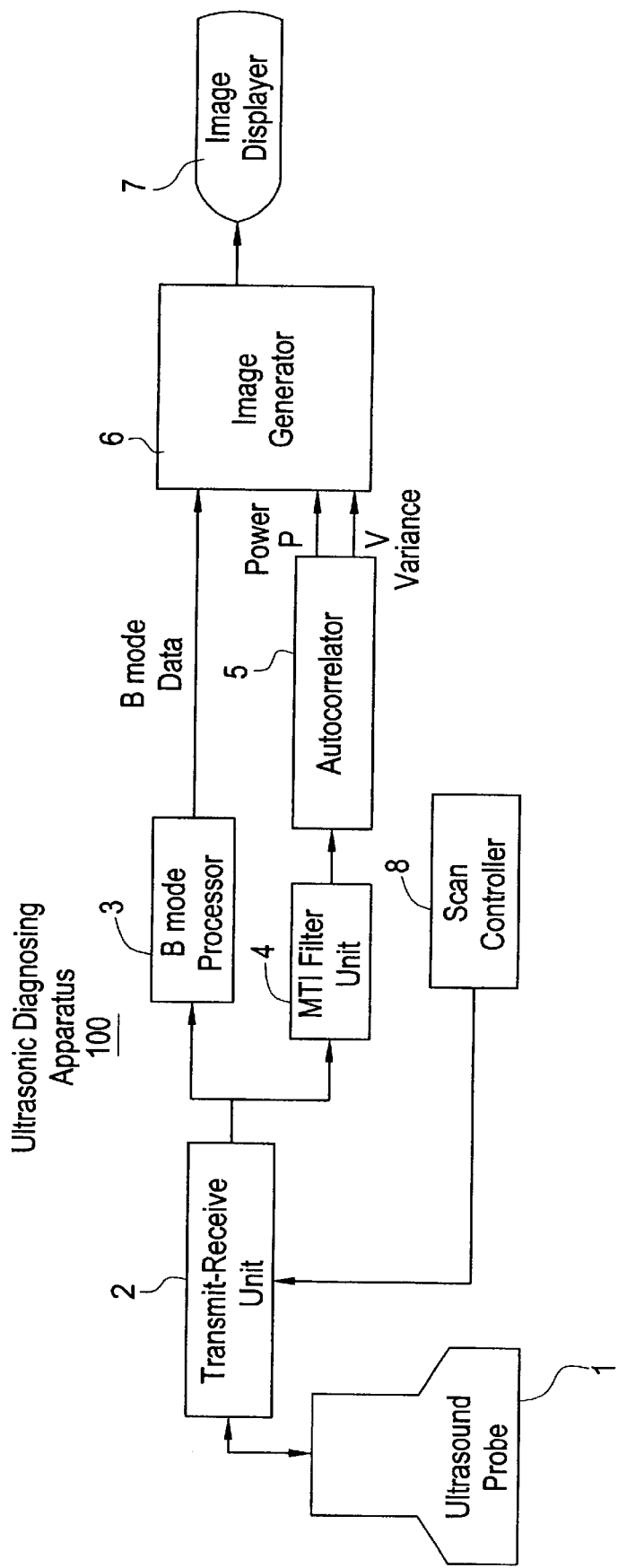
FIG. 1 is a configurational diagram showing an ultrasonic diagnosing apparatus according to a first embodiment of the present invention.

FIG. 1 is a configurational diagram showing an ultrasonic diagnosing apparatus according to a first embodiment of the present invention.

The ultrasonic diagnosing apparatus 100 is configured so as to include an ultrasound probe 1, a transmit-receive unit 2, a B mode processor 3, an MTI (Moving Target Indicator) filter unit 4, an autocorrelator 5, an image generator 6, an image displayer 7, and a scan controller 8.

The ultrasonic probe 1 and the transmit-receive unit 2 collect ultrasound echo signals from a large number of sampling points two-dimensionally distributed in an internal space of a sample.

The B mode processor 3 generates B mode data from the ultrasound echo signals at the large number of two-dimensionally distributed sampling points.

The MTI filter unit 4 takes out moving components from the ultrasound echo signals at the large number of two-dimensionally distributed sampling points.

The autocorrelator 5 determines power P of motion at the large number of two-dimensionally distributed sampling points and determines variance V of the motion.

The image generator 6 produces a B mode image from the B mode data. An ultrasonic image to be described next is generated from the power P and the variance V.

The image displayer 7 displays the B mode image or the ultrasonic image thereon. Further, the image displayer 7 displays a monochrome B mode image and an ultrasonic image of a chromatic color (e.g., red) so as to overlap each other.

The scan controller 8 performs a real-time scan or an intermittent scan according to operator's instructions.

Upon the real-time scan, a packet size ranges from 4 to 8, for example, and a frame rate is 30 frames/second, for example.

Upon the intermittent scan, a packet size ranges from 8 to 10, for example, and a frame rate is 1 frame/second, for example.

A process for generating an ultrasonic image from the power P and the variance V will next be described.

Figure 2:
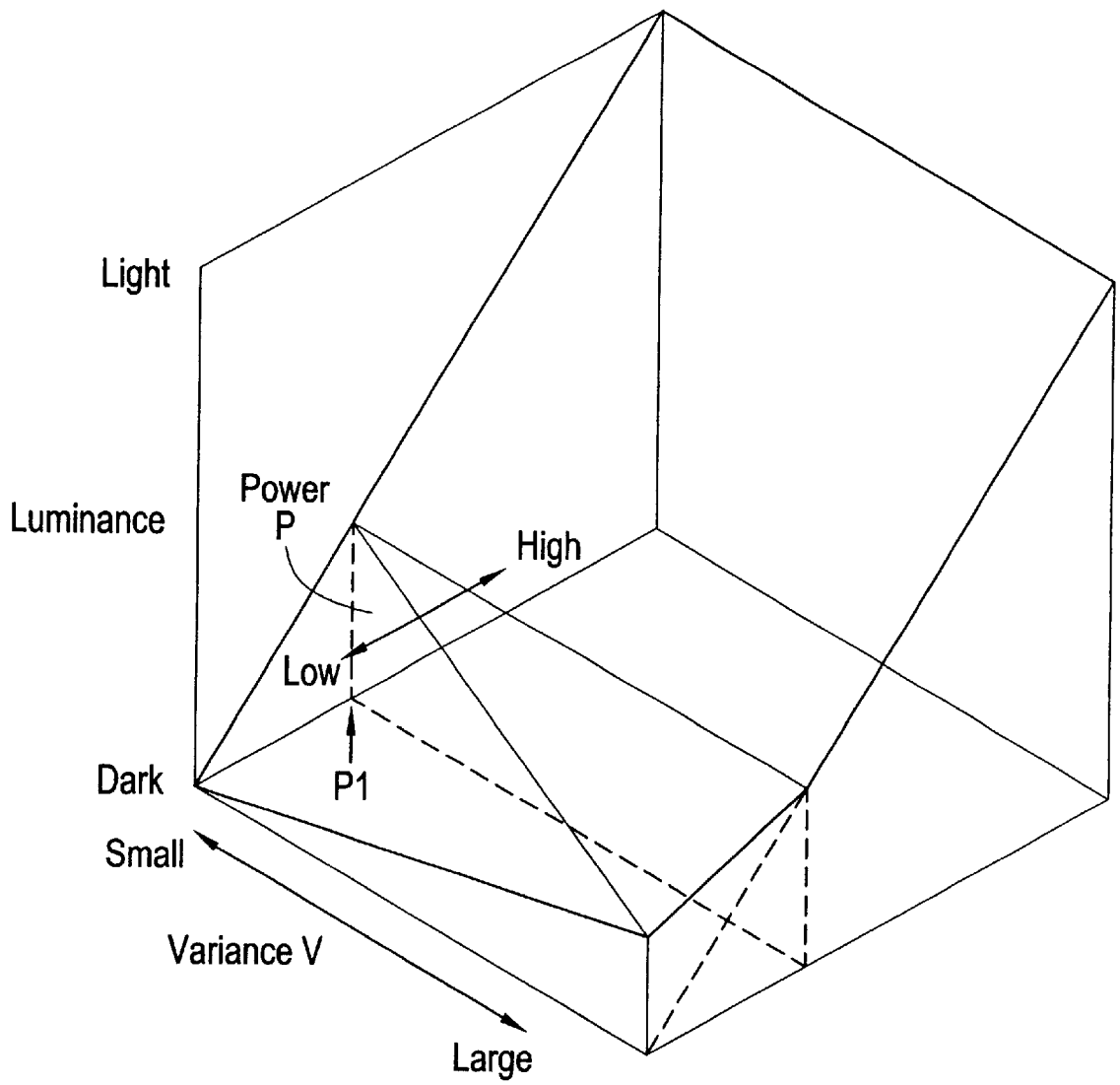
FIG. 2 is a conceptual diagram illustrating a characteristic solid for converting power and variance to luminance.

FIG. 2 is a luminance characteristic solid for converting power P and variance V at a given sampling point to luminance of their corresponding pixel.

Basically, the luminance increases as the power P becomes high. The hue is set to either one achromatic color or one chromatic color, and the chroma is also kept constant.

However, when there are two sampling points identical in power P but different in variance V in a region in which the power P is low (P≦P1), the luminance of a pixel corresponding to the sampling point relatively large in variance V is set higher than that of a pixel corresponding to the sampling point relatively small in variance V.

Since an ultrasonic image produced when contrast agents get into a bloodstream directed to a liver to take a picture of the liver, for example, increases in signal strength, the gain is greatly reduced to inhibit blooming. When the gain is greatly reduced, the capability of projecting thin blood vessels is degraded. However, when the contrast agents are administered to the bloodstream, the variance V increases.

Therefore, the luminance of a pixel corresponding to a sampling point relatively large in variance V is turned up and thereby raised in a region low in power P, wherein the blooming presents a problem. As a result, the capability of projecting the thin blood vessels is enhanced. Namely, it is possible to inhibit the blooming and prevent degradation in the capability of projecting the thin blood vessels.

Second Embodiment

Figure 3:
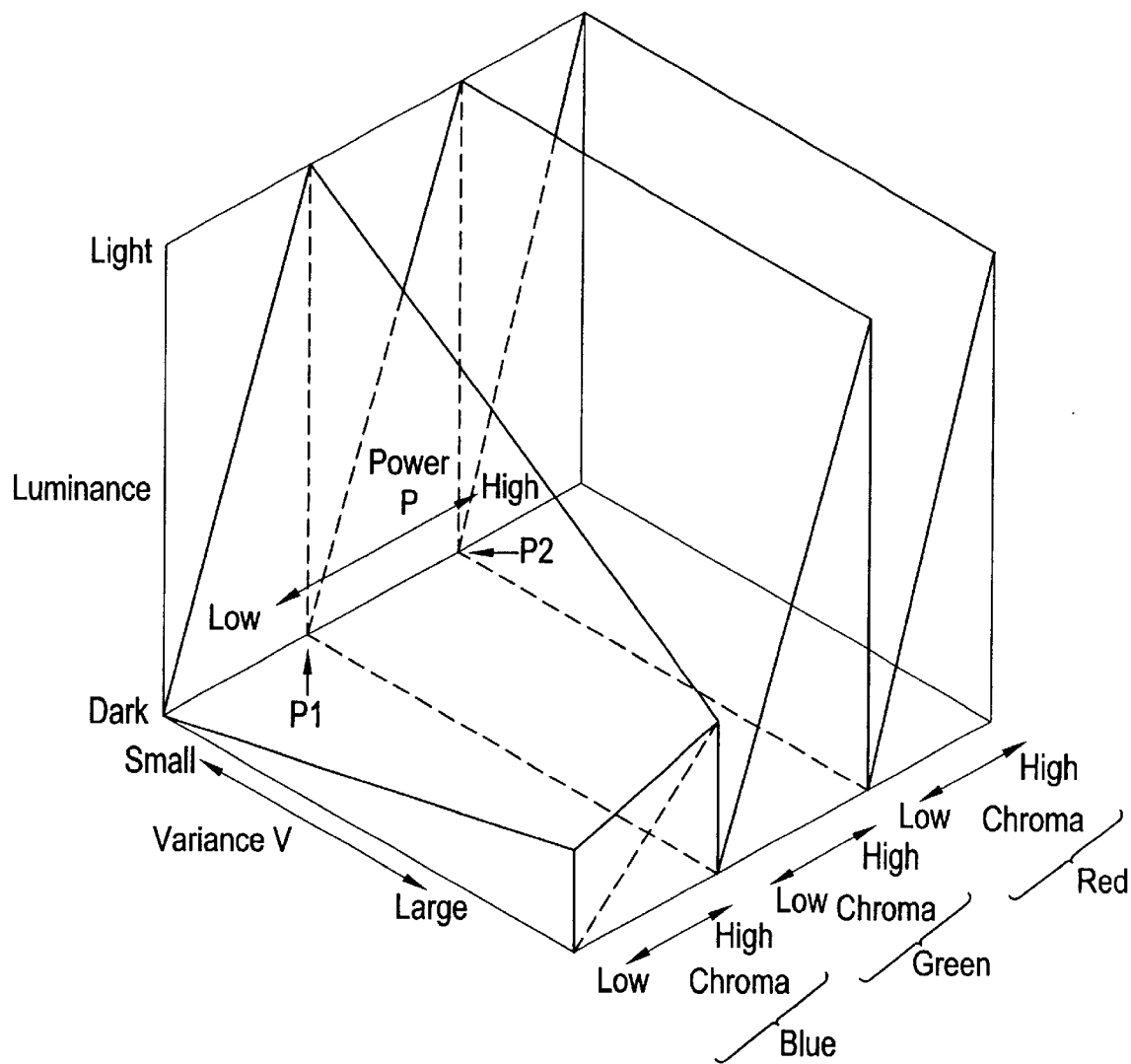
FIG. 3 is a conceptual diagram showing a characteristic solid for converting power and variance to luminance/chroma/hue.

Using such luminance/chroma/hue characteristic solid as shown in FIG. 3, power P and variance V at a given sampling point may be converted into luminance/chroma/hue of their corresponding pixel.

Basically, for example, blue is set in a region low in power P (P≦P1), for example, green is set in a region medium in power P (P1<P≦P2), and, for example, red is set in a region high in power P (P2<P). As the power P becomes strong, the luminance and chroma are enhanced within the same hue.

However, when there are two sampling points identical in power P but different in variance V in a region in which the power P is low (P≦P1), the luminance of a pixel corresponding to the sampling point relatively large in variance is set higher than that of a pixel corresponding to the sampling point relatively small in variance V.

Third Embodiment

An image generator 6 determines a load sum D of power P and variance V and generates an ultrasonic image from the load sum D.

The load sum D is as follows:

$$D = P \cdot a + V \cdot (1-a)$$

Incidentally, the above equation is an expression indicative of a basic concept. It is actually necessary to adjust the levels of the power P and the variance V.

Figure 4:
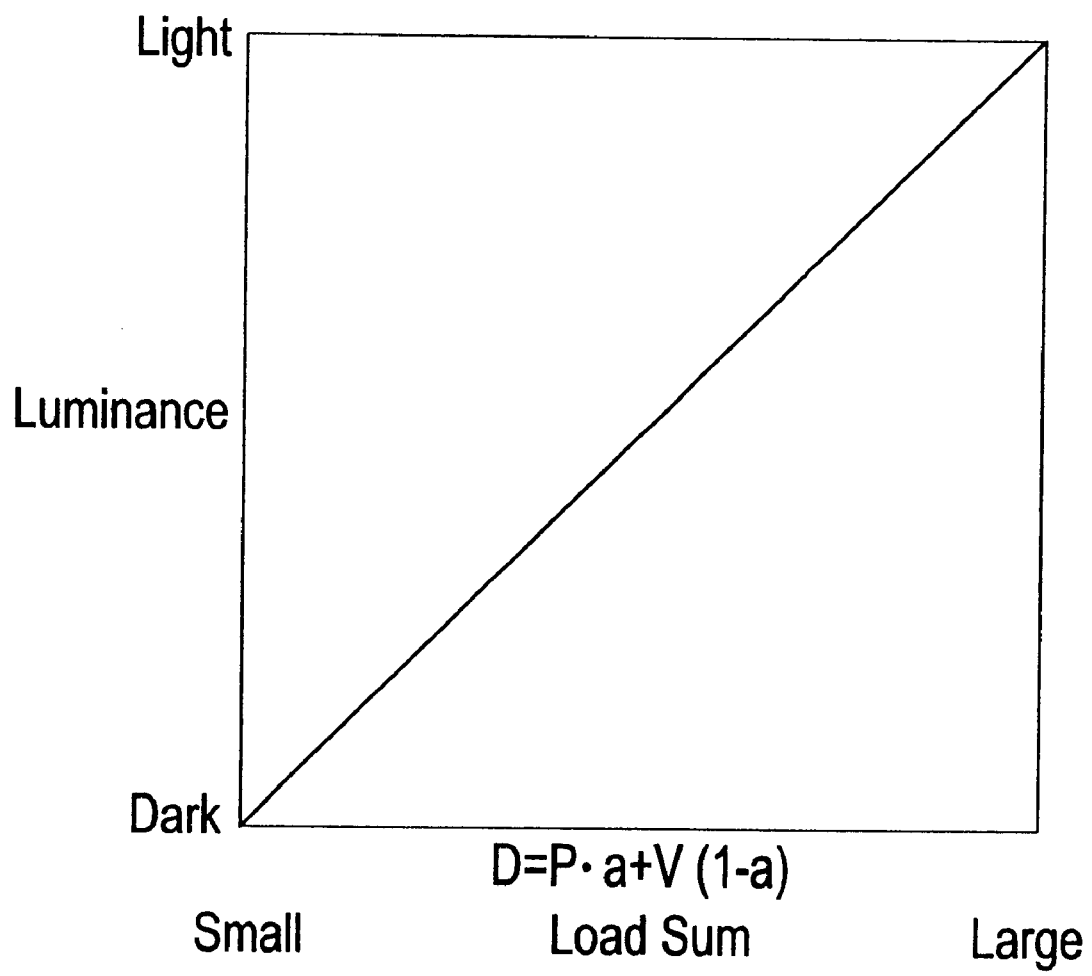
FIG. 4 is an explanatory diagram illustrating a characteristic curve for converting a load sum to luminance.

As shown in FIG. 4, the luminance is raised as the load sum D becomes great. The hue is set to either one achromatic color or one chromatic color, and the chroma is also kept constant.

Figure 5:
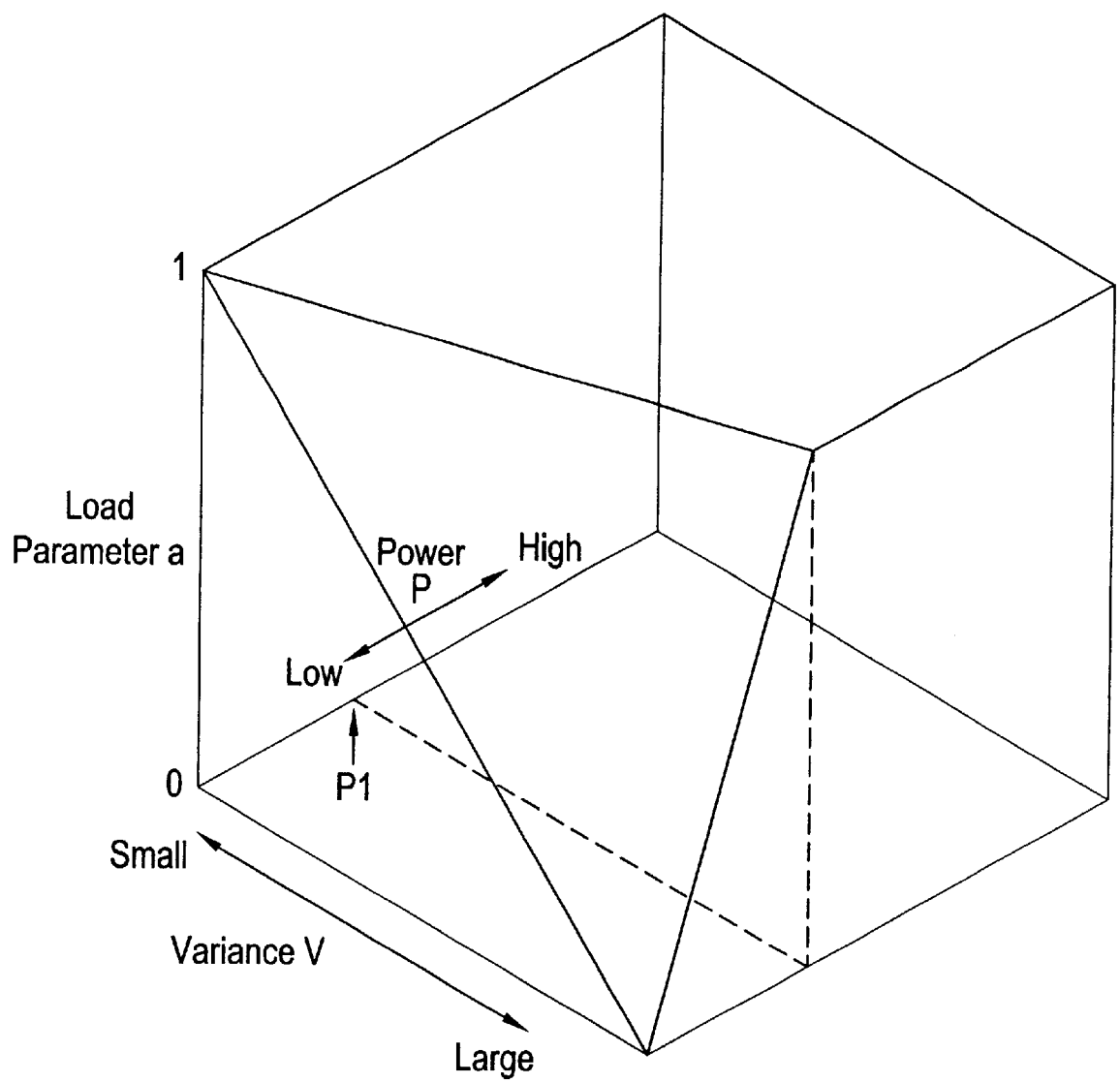
FIG. 5 is a conceptual diagram showing a characteristic solid for converting power and variance to load parameters.

A load parameter a is determined by a load parameter characteristic solid shown in FIG. 5 by way of example. In a region high in power P (P1<P), the load parameter a=1. In this case, $$D = P$$

and the power P determines the luminance.

In a region low in power P (P≦P1), the load parameter a becomes close to 1 when the variance V is small. In this case, the power P determines the luminance dominantly. When the variance V is large, the load parameter a becomes close to 0. In this case, the variance V determines the luminance dominantly. When the power P is of the lowest and the variance V is of the largest, the load parameter a=0. In this case, $$D = V$$

and thus the variance V determines the luminance.

Since an ultrasonic image produced when contrast agents get into a bloodstream directed to a liver to take a picture of the liver, for example, increases in signal strength, the gain is greatly lowered to inhibit blooming. When the gain is greatly reduced, the capability of projecting thin blood vessels is degraded. However, when the contrast agents are put in the bloodstream, the variance V increases. Therefore, in a region low in power P, wherein the blooming is of a problem, the load sum D corresponding to a sampling point relatively large in variance V becomes large, and the luminance of a pixel corresponding thereto is turned up and thereby raised. As a result, the capability of extracting the thin blood vessels is enhanced. Namely, it is possible to inhibit the blooming and prevent degradation in the capability of projecting the thin blood vessels.

Fourth Embodiment

Figure 6:
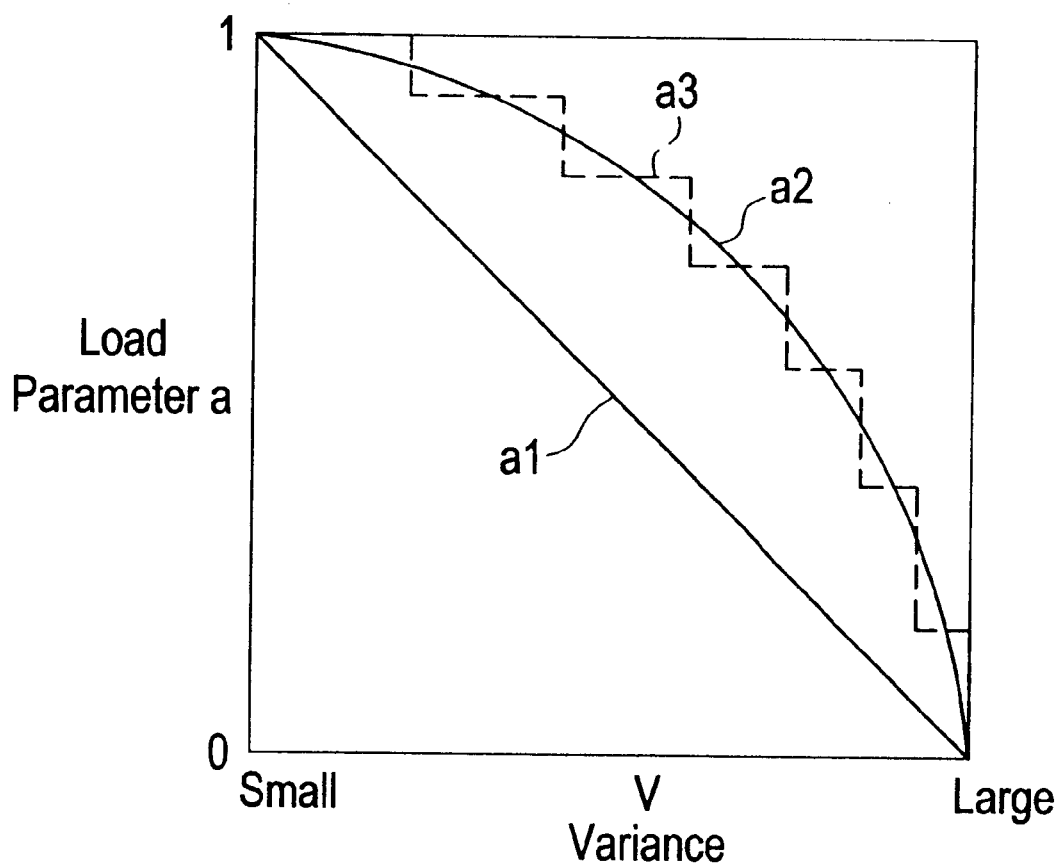
FIG. 6 is a conceptual diagram illustrating another characteristic solid for converting power and variance to load parameters.

A character al shown in FIG. 6 conceptually illustrates a load parameter characteristic (see FIG. 5) of the third embodiment. Namely, to put it simply, a load parameter a is 1 when the variance is small, whereas when the variance is large, the load parameter a is 0. Further, when the variance is intermediate, the load parameter a varies linearly.

On the other hand, a characteristic may be used in which as in the case of a2 shown in FIG. 6, the load parameter a is 1 when the variance is small and is 0 when the variance is large, and the load parameter a changes suddenly as the variance becomes large.

Further, a characteristic may be used wherein as in the case of a3 shown in FIG. 6, the load parameter a is 1 when the variance is small, and is 0 when the variance is large, and when the variance is intermediate, the load parameter a changes stepwise.

Fifth Embodiment

Figure 7:
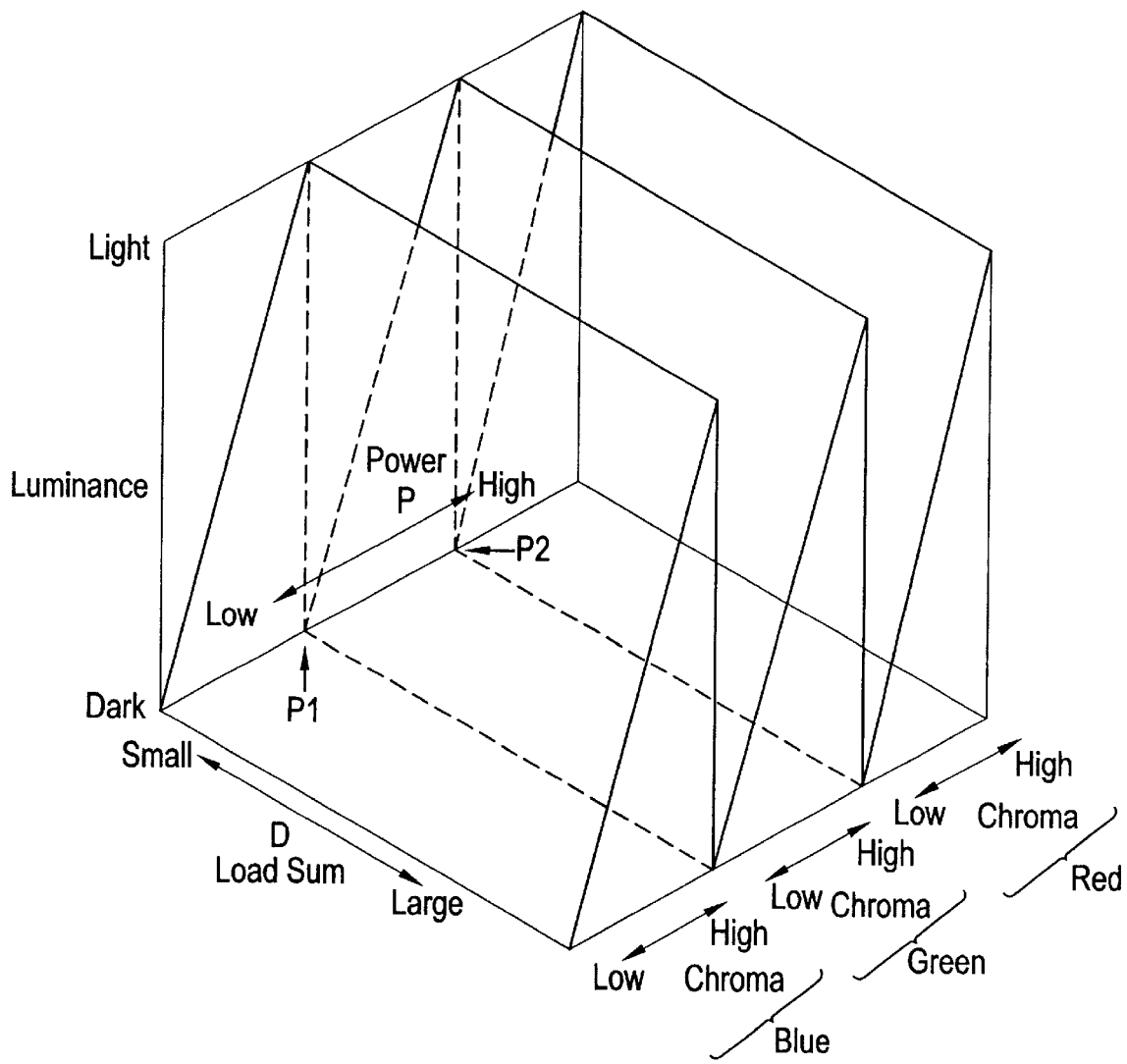
FIG. 7 is a conceptual diagram depicting a characteristic solid for converting a load sum to luminance/chroma/hue.

Using such load sum-luminance/chroma/hue characteristics as shown in FIG. 7, power P and variance V at a given sampling point may be converted into luminance/chroma/hue of their corresponding pixel.

Basically, for example, blue is set in a region low in power P (P≦P1), for example, green is set in a region medium in power P (P1≦P<P2), and, for example, red is set in a region high in power P (P2<P). As the power P becomes strong, the luminance and chroma are enhanced within the same hue.

However, in a region low in power P, in which blooming presents a problem, a load sum D corresponding to a sampling point relatively large in variance V becomes large, and the luminance and chroma of a pixel thereat are turned up and thereby raised. As a result, the capability of projecting thin blood vessels is enhanced. Namely, it is possible to inhibit the blooming and prevent degradation of the capability of projecting the thin blood vessels.

Many widely different embodiments of the invention may be configured without departing from the spirit and the scope of the present invention. It should be understood that the present invention is not limited to the specific embodiments described in the specification, except as defined in the appended claims.

What is claimed is:

1. An ultrasonic diagnosing apparatus comprising:
an ultrasound probe;
a transmitting and receiving device for transmitting an ultrasound wave from the ultrasound probe to within an object to thereby collect ultrasound echo signals from within the object;
a power/variance acquiring device for acquiring power and variance at a large number of two-dimensionally distributed sampling points from the ultrasound echo signals;
an ultrasonic image generating device for increasing luminance according as pixels corresponding to sampling points high in power, and generating, when there are two sampling points identical in power but different in variance and low in power, an ultrasonic image in which the luminance of the sampling point relatively large in variance is set higher than that of the sampling point relatively small in variance; and
an image display device for displaying the ultrasonic image thereon.

2. An ultrasonic diagnosing apparatus comprising:
an ultrasound probe;
a transmitting and receiving device for transmitting an ultrasound wave from the ultrasound probe to within an object to thereby collect ultrasound echo signals from within the object;
a power/variance acquiring device for obtaining power and variance at a large number of two-dimensionally distributed sampling points from the ultrasound echo signals;
an ultrasonic image generating device for reflecting the strength of power at a given sampling point on at least one of luminance, chroma and hue of its corresponding pixel, and when there are two sampling points identical in power but different in variance and low in power, generating an ultrasonic image in which a pixel corresponding to the sampling point relatively large in variance is set so as to be seen relatively higher in power than a pixel corresponding to the sampling point relatively small in variance; and
an image display device for displaying the ultrasonic image thereon.

3. An ultrasonic diagnosing apparatus comprising:
an ultrasound probe;
a transmitting and receiving device for transmitting an ultrasound wave from the ultrasound probe to within an object to thereby collect ultrasound echo signals from within the object;
a power/variance acquiring device for obtaining power and variance at a large number of two-dimensionally distributed sampling points from the ultrasound echo signals;
an ultrasonic image generating device for setting a load of power higher than a load of variance when the variance is small and setting a load of power lower than a load of variance when the variance is large, to thereby determine a load sum of the power and variance, and generating an ultrasonic image increased in luminance according as pixels corresponding to sampling points large in the load sum; and
an image display device for displaying the ultrasonic image thereon.

4. The ultrasonic diagnosing apparatus according to claim 3, wherein when power is defined as P, variance is defined as V and a load sum is defined as D, $$D = P \cdot a + V \cdot (1-a)$$

where a is 0 when the variance is large, 1 when the variance is small, and changes smoothly or stepwise when the variance is intermediate.

5. The ultrasonic diagnosing apparatus according to claim 4, wherein a is 0 when the variance is large, and 1 when the variance is small, and a changes gently in the neighborhood of a=0 and changes suddenly in the neighborhood of a=1.

6. The ultrasonic diagnosing apparatus according to claim 1, wherein a real-time scan or an intermittent scan is carried out.

7. The ultrasonic diagnosing apparatus according to claim 1, wherein the ultrasonic image generating device generates an ultrasonic image obtained by causing the ultrasonic image and a B mode image to overlap each other.

8. The ultrasonic diagnosing apparatus according to claim 2, wherein a real-time scan or an intermittent scan is carried out.

9. The ultrasonic diagnosing apparatus according to claim 3, wherein a real-time scan or an intermittent scan is carried out.

10. The ultrasonic diagnosing apparatus according to claim 2, wherein the ultrasonic image generating device generates an ultrasonic image obtained by causing the ultrasonic image and a B mode image to overlap each other.

11. The ultrasonic diagnosing apparatus according to claim 3, wherein the ultrasonic image generating device generates an ultrasonic image obtained by causing the ultrasonic image and a B mode image to overlap each other.

12. An ultrasonic diagnosing method for inhibiting blooming and preventing degradation of a capability of projecting thin blood vessels comprising:

transmitting an ultrasonic wave from an ultrasonic probe to within an object to collect ultrasound echo signals from within the object;

acquiring power and variance at two-dimensionally distributed sampling points from the ultrasound echo signals;

reflecting the strength of power at a given sampling point on at least one of luminance, chroma and hue of its corresponding pixel, and when there are two sampling points identical in power but different in variance and low in power, generating an ultrasonic image in which a pixel corresponding to the sampling point relatively large in variance is set so as to be seen relatively higher in power than a pixel corresponding to the sampling point relatively small in variance; and displaying the ultrasonic image.

13. An ultrasonic imaging method in accordance with claim 12 further comprising overlapping the ultrasonic image with a B mode image to generate an overlapped image.

14. An ultrasonic diagnosing method for inhibiting blooming and preventing degradation of a capability of projecting thin blood vessels comprising:

transmitting an ultrasonic wave from an ultrasonic probe to within an object to collect ultrasound echo signals from within the object;

acquiring power and variance at two-dimensionally distributed sampling points from the ultrasound echo signals;

setting a load of power higher than a load of variance when the variance is small and setting a load of power lower than a load of variance when the variance is large, to determine a load sum of power and variance;

generating an ultrasonic image in which the magnitude of the load sum is reflected on at least one of luminance, chroma and hue of pixels corresponding to the sampling points; and displaying the ultrasonic image.

15. An ultrasonic diagnosing method in accordance with claim 14 further comprising:

defining the power as P;

defining the variance as V;

defining a load parameter as a;

defining the load sum as D, wherein $D = P \cdot a + V \cdot (1-a)$.

16. An ultrasonic diagnosing method in accordance with claim 15 wherein a=0 when the variance is large, a=1 when the variance is small, and a changes stepwise when the variance is intermediate.

17. An ultrasonic diagnosing method in accordance with claim 14 further comprising overlapping the ultrasonic image with a B mode image to generate an overlapped image.

* * * * *

UNITED STATES PATENT AND TRADEMARK OFFICE
CERTIFICATE OF CORRECTION

PATENT NO. : 6,659,952 B2
DATED : December 9, 2003
INVENTOR(S) : Yoichi Suzuki

It is certified that error appears in the above-identified patent and that said Letters Patent is hereby corrected as shown below:

Column 9,
Line 53, delete "a power/variance" and insert therefor -- an --.
Line 58, delete "according as" and insert therefor -- of --.

Column 10,
Lines 7 and 29, delete "a power/variance" and insert therefor -- an --.
Line 38, delete "increased in luminance according as" and insert therefor -- with increased luminance of --.

Signed and Sealed this

Fifth Day of April, 2005

JON W. DUDAS
*Director of the United States Patent and Trademark Office*